United States Patent [19]
Mayo, Jr.

[11] Patent Number: 4,599,854
[45] Date of Patent: Jul. 15, 1986

[54] ADJUSTABLE DRAFT TUBE
[75] Inventor: Howard A. Mayo, Jr., York, Pa.
[73] Assignee: Allis-Chalmers Corporation, Milwaukee, Wis.
[21] Appl. No.: 660,305
[22] Filed: Oct. 12, 1984
[51] Int. Cl.$^4$ ............................................. F16D 31/02
[52] U.S. Cl. ........................................ 60/398; 290/52; 290/54
[58] Field of Search ............... 290/52, 54, 43; 60/398; 417/334

[56] References Cited
U.S. PATENT DOCUMENTS

| 2,713,643 | 7/1955 | Rheingans | 290/52 X |
| 3,582,667 | 6/1971 | Mayo | 290/52 |
| 4,345,159 | 8/1982 | Gutierrez-Atencio | 290/52 X |

Primary Examiner—Edward K. Look
Attorney, Agent, or Firm—Timothy R. Conrad; Arthur M. Streich

[57] ABSTRACT

An adjustable draft tube is disclosed for a hydraulic turbine installation. The draft tube includes a pair of fabricated box piers which are positioned in a tailwater with the turbine outlet disposed between the piers. The piers are anchored to a tailwater floor and a powerhouse foundation wall. A roof is provided extending between opposing surfaces of the piers with an edge of the roof pivotally secured to the piers above the turbine outlet. The roof is pivotable between a first position with a downstream edge of the roof disposed beneath a predetermined low tailwater elevation and a second position with the downstream edge disposed between the low tailwater elevation and a predetermined high tailwater elevation.

1 Claim, 2 Drawing Figures

ADJUSTABLE DRAFT TUBE

BACKGROUND OF THE INVENTION

1. Field of the Invention

This invention relates to hydraulic turbine installations. More particularly, this invention relates to an adjustable draft tube for a hydraulic turbine installation.

2. Description of the Prior Art

Hydraulic turbine draft tubes provide a gradually expanding discharge passage for water flowing from a turbine runner to a tailwater. The draft tube supplements the action of the turbine runner by using most of the energy remaining in the water discharging from the runner. Draft tubes are shaped to decelerate water flow with a minimum of loss so the kinetic energy of the flow discharged from the runner may be efficiently regained by conversion into a suction head thereby increasing the total pressure difference on the runner. The draft tube also serves to regain static suction head in cases where the runner is located above the tailwater level.

For a draft tube to operate properly, its discharge opening must be adequately submerged beneath the tailwater level. If the discharge opening is inadequately submerged, air can enter the draft tube and the suction head could be lost.

The tailwater level for a hydraulic turbine installation may vary considerably due to seasonal flooding and other influences. To account for variations in tailwater level, prior art hydraulic turbine installations submerged the draft tube as much as possible. At the very least, the draft tube was positioned to be submerged below a predetermined low tailwater level. While this practice maintained the draft tube's seal by preventing air flow into the draft tube, the practice necessitated a substantial amount of excavation with a corresponding increase in cost. For economically marginal turbine installations, the high excavation costs of adequately submerging a draft tube could make the installations economically unfeasible.

OBJECTS AND SUMMARY OF THE INVENTION

It is an object of the present invention to provide a draft tube for a hydraulic turbine which is sealed from the air and which does not require substantial excavation.

It is a further object of the present invention to provide a hydraulic turbine draft tube which has a variable roof which may be lowered to seal the draft tube at low tailwater levels and raised to provide a larger discharge area for high tailwater levels.

According to a preferred embodiment of the present invention, a hydraulic turbine installation is provided having a foundation structure separating a high elevation headwater from a low elevation tailwater. The level of the tailwater varies between a predetermined high tailwater level and a predetermined low tailwater level. A water passageway is formed through the foundation connecting the headwater and tailwater in water flow communication. A runner for a hydraulic turbine is supported within the passageway.

An adjustable draft tube is provided within the tailwater. The draft tube comprises a pair of vertical side walls which are secured to the foundation structure with the passageway outlet disposed between the side walls. The side walls are further secured to the floor of the tailwater reservoir. The draft tube includes a roof member which is a flap having an end pivotally secured to the foundation structure above the outlet. The flap extends between the side walls and has a free end. The flap is pivoted between a first position with the free end beneath the predetermined low tailwater level and a second position with the free end between the low tailwater level and the high tailwater level.

DESCRIPTION OF THE DRAWINGS

FIG. 1 is a longitudinal view in cross section of a hydraulic turbine installation with an adjustable draft tube; and FIG. 2 is a plan view partially in cross section of the installation of FIG. 1.

DESCRIPTION OF THE PREFERRED EMBODIMENT

Figures 1, 2:
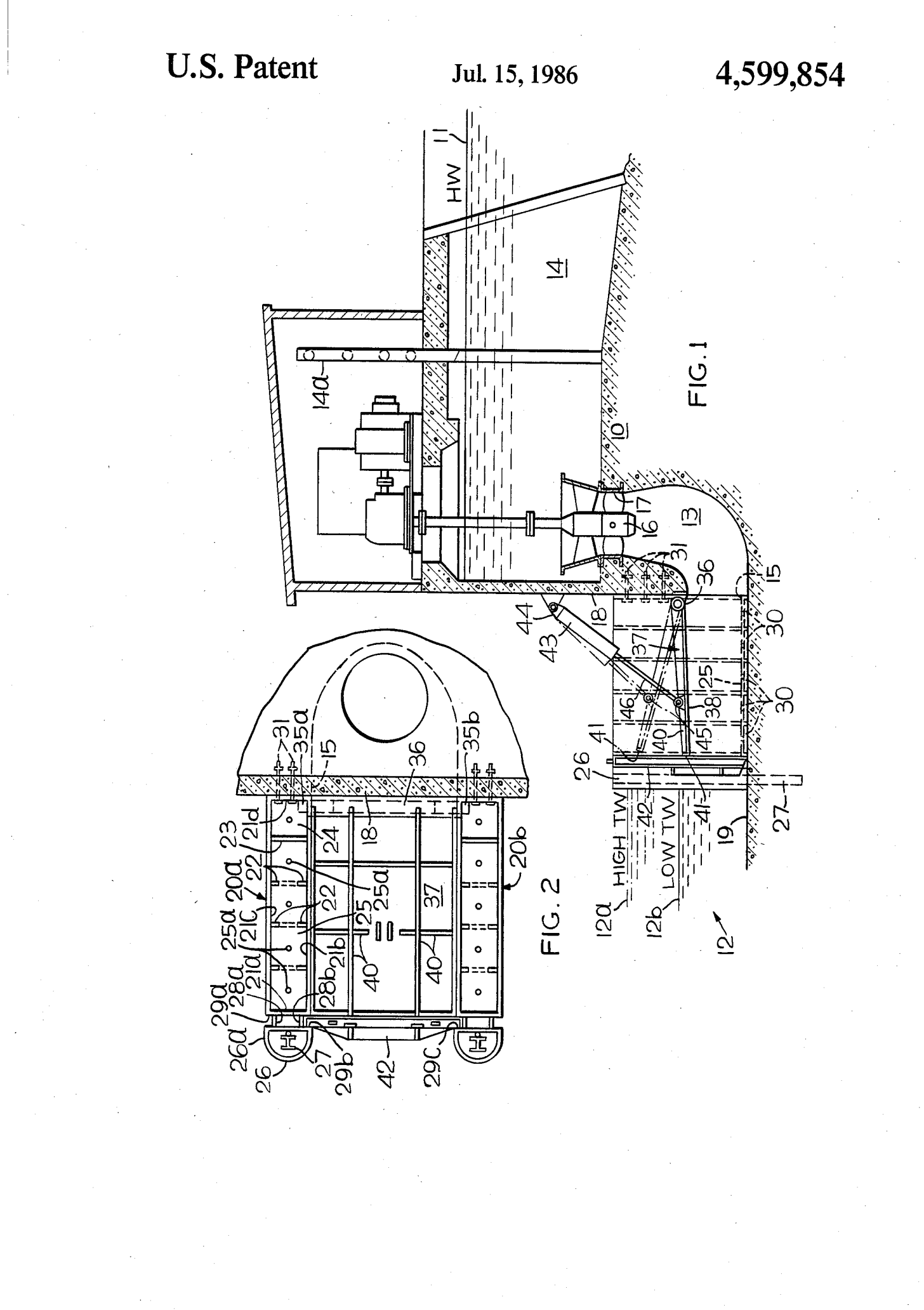

Referring to FIG. 1, a hydraulic turbine installation is shown having a foundation structure 10 separating a high elevation headwater 11 from a low elevation tailwater 12. Over time the tailwater level fluctuates. This is due in part to seasonal flooding. As the level fluctuates, the tailwater varies between a predetermined high tailwater level 12a and a predetermined low tailwater level 12b.

A water passageway 13 is formed through the foundation structure 10 with the passageway 13 having an inlet 14 submerged within the headwater 11 and an outlet 15 in communication with the tailwater 12. A turbine runner 16 is supported within a cylindrical portion 17 of the passageway 13. A vertical sliding gate 14a is provided for closing the inlet 14 to shut off flow to permit maintenance.

As shown in FIG. 1, the foundation has a vertical flat face 18 facing the tailwater 12. The tailwater is provided with a flat horizontal floor 19 which may be of poured concrete or a scraped smooth riverbed. Outlet 15 is formed in vertical face 18. From the turbine runner 16 to the outlet 15, the water passageway 13 diverges and changes in cross-sectional shape from the cylindrical portion 17 to the outlet 15 which is rectangular. The outlet 15 is flush with the floor 19.

An adjustable draft tube portion is provided within the tailwater and comprises a pair of side walls or side piers 20a and 20b. Pier 20a is identical to pier 20b and a description of one will suffice as a description of the other. The pier 20a is a fabricated steel box having plate steel walls 21a, 21b, 21c, and 21d joined to form the box of the pier. A plurality of reinforcing ribs 22 is provided on the interior surface of the walls 21b and 21c. A partition wall 23 extends between the walls 21b and 21c to define an access chamber 24 on an end of the pier.

The pier is provided with a horizontal floor plate 25 spaced above floor 19. On an end of the pier opposite the access chamber 24, a hollow pillar 26 is provided having a semicircular cross-section size sufficient for an H-pile 27 to extend through the pillar 26. Pillar wall 26a is welded to spacers 28a and 28b which in turn are welded to the wall 21a of the pier. The pillar wall 26a, spacers 28a and 28b and wall 21a cooperate to define two slots 29a and 29b which extend along both sides of the pier 20a.

The piers 20a and 20b are positioned in the tailwater 12 with the piers vertical and parallel and with the discharge 15 of the passageway 13 positioned between the piers 20a and 20b. As shown in FIG. 2, opposing surfaces of the piers 20a and 20b are flush with the outlet 15. The end of the pier having the access chamber 24 abuts the vertical foundation wall 18. The outboard end of the wall having the pillar 26 is anchored to the floor 19 of the tailwater 12 by means of an H-pile 27 driven through the floor 19 and extending through the pillar 26. The hollow pillar 26 is filled with concrete securing the pillar 26 to the H-pile.

Grout pipes (not shown) are extended through holes 25a formed in the floor plate 25. Grout is pumped into chambers 30 defined by the floor plate 25, reinforcing ribs 22 and the floor 19. The grout seals the piers to the floor 19. The access chamber 24 is dewatered permitting access into the chamber 24. The pier is secured to the wall 18 by means of anchor bolts 31 extending through the wall 21d of the pier into the foundation 10. The interior of the pier defined by walls 21a, 21b, 21c and the partition wall 23 may be filled with concrete to ballast the pier.

Trunnions 35a and 35b are secured to the piers. A first trunnion 35a is aligned to be coaxial with a second trunnion 35b along a generally horizontal axis immediately above the water passage outlet 15. A torque tube 36 is pivotally received on the trunnions with the trunnions extending into the tube 36 and with the tube 36 rotatable about the horizontal axis.

A roof member 37 is secured to the torque tube 36 and comprises a flap 38 secured to the torque tube 36. The flap 38 is sized to extend between the side piers 20a and 20b with the gaps between the flap 38 and side piers sealed by any suitable means. The trunnions 35a and 35b are secured to the side piers such that the flap 38 is flush with the top of the water passageway outlet 15. Suitable means known in the art can be provided to seal the gap between the flap 38 and the foundation wall 18 at the top of the outlet 15. The flap 38 is reinforced by a plurality of transverse and longitudinal reinforcing ribs 40. The flap 38 extends downstream from the torque tube 36 to a free end 41.

The roof member 37 pivots with the torque tube 36 around the horizontal axis with the length of the flap 38 from the torque tube to the free end 41 sized such that the roof 37 is movable between a first or lower position with the free end 41 beneath the predetermined low tailwater level (as shown in FIG. 1) and a second or upper position with the free end 41 between the low tailwater level and the high tailwater level (as shown by the phantom lines in FIG. 1). A stoplog bulkhead 42 is provided sized to extend between the piers and be slideably received within opposing slots 29b and 29c. The bulkhead positions the piers while they are being installed and permits the area defined by the piers, the back wall 18 and the stoplog bulkhead 42 to be dewatered if desired. With the bulkhead 42 removed, the installation is in condition for operation.

The roof member 37 is pivoted by means of a hydraulic servomotor 43. A head end 44 of the servomotor 43 is pivotally secured to the foundation wall 18. The piston rod end 45 of the servomotor 43 is pivotally secured to the roof member 37. Pressurization of the lower side of the servomotor pivots the roof 37 to the upper or second position. Pressurization of the head end pivots the roof 37 back to the first position or, alternatively, the roof 37 can fall under gravity.

When operation of the hydraulic turbine is initiated, water flow through the passageway 13 is small. Consequently, a low tailwater elevation typically exists when operation is initiated. In such conditions, the roof 37 of the adjustable draft tube is lowered to its lowest position with its free end submerged beneath the low tailwater elevation. When turbine operation is initiated, the velocity of water flow through the water passageway is low and, accordingly, energy recovery is not critical to the performance of the turbine. Therefore, the relatively small cross-sectional area of the discharge end of the draft tube when the roof 37 is in the low position does not adversely affect the operation of the installation. As the flow of water through the passageway 13 increases, the tailwater elevation will increase and the movable roof 37 can be raised to provide improved head recovery by reason of the larger cross-sectional area and divergence of the roof. This will present improved head recovery and higher operating efficiency as well as greater power output under the lower heads caused by the high tailwater elevation.

From the foregoing detailed description of the present invention, it has been shown how the objects of the present invention have been attained in a preferred manner. However, modifications and equivalents of the disclosed concepts such as readily occur to those skilled in the art are intended to be included in the scope of this invention. Thus, the scope of the invention is intended to be limited only by the scope of the claims such as are or may hereafter be appended hereto.

The embodiment of the invention in which an exclusive property or privilege is claimed are defined as follows:

1. A hydraulic turbine installation comprising:
   a foundation structure separating a high elevation headwater from a lower elevation tailwater with a water level in said tailwater variable between a predetermined high tailwater level and a predetermined low tailwater with said foundation structure presenting a generally vertical wall on the downstream side within said tailwater reservoir and a generally horizontal floor extending away from said wall into said tailwater;
   a water passageway formed through said foundation having an inlet in communication with said high elevation reservoir and an outlet in communication with said low elevation tailwater with said passageway being generally rectangular and having a lower surface flush with said floor and said passageway having a roof member and opposing side walls flush with said outlet;
   a turbine runner rotatably supported within said passageway intermediate said inlet and outlet;
   an adjustable draft tube portion provided on the downstream side of said vertical wall and within said tailwater comprising a pair of vertical side walls each comprising a pier having a generally rectangular cross-section box frame with a plurality of reinforcing ribs secured to interior surfaces of said frame and a floor plate spaced from said tailwater floor to define a plurality of cavities within each pier;
   means for securing upstream edges of said sidewalls to said foundation structure with said passageway outlet disposed between said side walls; means for securing said side walls to a floor of said tailwater;
   a draft tube roof member comprising a flap having an end pivotally secured to said foundation structure above said outlet with said roof member generally horizontal and pivotal about a generally horizontal axis of rotation; said flap extending between said side walls and pivotal about said axis with a free end of said flap movable between a first position beneath said predetermined low tailwater level and a second position between said predetermined low tailwater level and said predetermined high tailwater level;

a pair of horizontally axially aligned opposing trunnions secured to said frames, a torque tube extending between piers and carried by said trunnions for pivotal movement about a horizontal axis central of said tube, and said flap secured to said tube for pivotal movement therewith; and means for pivoting said flapo with said free end moving between said first and second positions.

* * * * *